United States Patent [19]
Shirodkar et al.

[11] Patent Number: 5,474,694
[45] Date of Patent: Dec. 12, 1995

[54] LUBRICATING OIL COMPOSITION

[75] Inventors: Shailaja M. Shirodkar, Beacon; Cyril A. Migdal, Croton-on-Hudson, both of N.Y.

[73] Assignee: Texaco Inc., White Plains, N.Y.

[21] Appl. No.: 947,595

[22] Filed: Sep. 21, 1992

[51] Int. Cl.⁶ .................. C10M 105/66; C10M 105/70
[52] U.S. Cl. ........................................... 252/51.5 A
[58] Field of Search ................... 252/50, 51, 51.5 A

[56] References Cited

U.S. PATENT DOCUMENTS 5,167,848  12/1992  Chung et al. .............. 252/51.5 A
5,262,075  11/1993  Chung et al. .............. 252/51.5 A

*Primary Examiner*—José G. Dees
*Assistant Examiner*—Dwayne C. Jones

[57] ABSTRACT

An additive compositon comprising a graft and aminederivatized copolymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said ($C_3$–$C_{10}$) alpha-monoolefin and from about 0 to 15 mole percent of said polyene, said copolymer having a number average molecular weight ranging from about 5,500 to 50,000 and having grafted thereon at least 1.8 molecules of a carboxylic acid acylating function per molecule of said copolymer and reacting said grafted copolymer with an amino alcohol compound selected from the group consisting of a 2-Anilinoalcohol, a (2-hydroxyalkyl)pyrridine, a 4-(2-hydroxyalkyl) morpholine, a 1-(2-hydroxyalkyl)piperazine, a 1-(2-pyrrolidine and a 1-(2-hydroxyalkyl) 2-pyrrolidine.

21 Claims, No Drawings

LUBRICATING OIL COMPOSITION

BACKGROUND OF THE INVENTION

This invention relates to a novel functional lubricant additive which provides surprising dispersancy properties when employed in a single grade lubricating oil composition.

DISCLOSURE STATEMENT

Ethylene-propylene copolymers and ethylene-alpha olefin non-conjugated diene terpolymers which have been grafted and derivatized to provide valuable properties in lubricating oil compositions are well known.

U.S. Pat. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as U.S. Pat. No. 4,234,435 discloses carboxylic acid acylating agents derived from polyalkenes and a carboxylic reactant having a molecular weight from about 1300 to 5000 and having at least 1.3 carboxylic groups per equivalent of polyalkene useful as a lubricant additive.

U.S. Pat. No. 4,320,019 discloses a multipurpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,863,623 discloses multi-functional grafted and derivatized copolymers which provide viscosity index improvement, dispersancy and antioxidant properties in a multi-grade lubricating oil composition.

U.S. Pat. No. 4,713,189 discloses a lubricating oil composition having improved dispersancy and viton seal compatibility. The dispersant being prepared by coupling two polyethyleneamines with an aldehyde and a phenol, followed by conversion to a succinimide. The resulting coupled succinimide is then acylated with glycolic acid to form a glycolated Mannich phenol coupled mono-alkenyl succinimide.

U.S. Pat. No. 4,699,724 discloses a lubricating oil composition having improved dispersancy and Viton seal compatibility. The dispersant being prepared by coupling two mono-alkenyl succinimides with an aldehyde and phenol. The resulting coupled succinimide is then acylated with glycolic acid to form a glycolated Mannich phenol coupled mono-alkenyl succinimide.

U.S. Pat. No. 4,636,322 discloses a lubricating oil composition having improved dispersancy and Viton seal compatibility. The dispersant being prepared by coupling partly glycolated succinimides with an aldehyde and a phenol.

U.S. Pat. Nos. 4,137,185 and 4,144,181 disclose an oil-soluble, derivatized ethylene copolymers derived from about 2 to 98 wt. % ethylene, and one or more $C_3$–$C_{28}$ alpha-olefins, e.g. propylene, which are grafted, preferably solution-grafted under an inert atmosphere and at elevated temperatures and in the presence of a high-temperature, decomposable free-radical initiator, with an ethylenically-unsaturated dicarboxylic acid material and thereafter reacted with a polyamine having at least two primary amine groups, e.g. an alkylene polyamine such as diethylene triamine, to form carboxyl-grafted polymeric imide, usually maleimide, derivatives are reacted with an anhydride of a ($C_1$–$C_{30}$) hydrocarbyl substituted acid, preferably acetic anhydride, to yield an oil-soluble stable amide of said polyamine whereby oil solutions of said amide derivative are characterized by minimal viscosity change over an extended period of time. Useful number average molecular weight ($M_n$) of said copolymers range from about 700 to 500,000; however, if the molecular weight is from 10,000 to 500,000 then these copolymers are also useful as multifunctional viscosity index improvers.

U.S. Pat. No. 4,146,489 discloses graft copolymers wherein the backbone polymer is a rubbery, oil soluble ethylene-propylene copolymer or ethylene-propylene diene modified terpolymer and the graft monomer is a C-vinylpyridine or N-vinylpyrrolidone impart dispersant properties to hydrocarbon fuels and combined viscosity index improvement and dispersant properties to lubricating oils for internal combustion engines. The graft copolymers are prepared by intimate admixture of backbone polymer, graft monomer and free radical initiator at a temperature below initiation temperature, followed by a temperature increase to or above initiation temperature, thus providing a product containing little or no byproduct.

U.S. Pat. No. 4,482,464 discloses a lubricating oil composition comprising a major proportion of an oil of lubricating viscosity and a minor dispersant amount of a hydrocarbyl-substituted mono-and bis-succinimide compound having branched hydroxyacyl radicals.

U.S. Pat. No. 4,863,623 discloses an additive composition comprising a graft and amine-derivatized copolymer prepared from ethylene and at least one $C_3$–$C_{10}$ alpha-monoolefin and, optionally, a polyene selected from non-conjugated dienes and trienes comprising from about 15 to 80 mole percent of ethylene, from about 20 to 85 mole percent of said $C_3$–$C_{10}$ alpha monoolefin and from about 0 to 15 mole percent of said polyene having a average molecular weight ranging from about 5000 to 500,000 which has been reacted with at least one olefinic carboxylic acid acylating agent to form one or more acylating reaction intermediates characterized by having a carboxylic acid acylating function within their structure and reacting said reaction intermediate with an amino-aromatic polyamine compound from the group consisting of an N-arylphenylenediamine, an aminothiazole, an aminocarbazole, an amionindole, an aminopyrrole, an amino indazolinone, an aminomercaptotriazole, and an aminoperimidine to form said graft and amine-derivatized copolymer, and a lubricating oil composition containing same are provided.

U.S. Pat. No. 5,075,383 discloses an additive composition comprising a graft and amine-derivatized copolymer prepared from ethylene and at least one $C_3$–$C_{10}$ alpha-monoolefin and, optionally a polyene selected from non-conjugated dienes and trienes comprising from about 15 to 80 mole percent of ethylene, from about 20 to 85 mole percent of said $C_3$ to $C_{10}$ alpha-monoolefin and from about 0 to 15 mole percent of said polyene, said copolymer having a number average molecular weight ranging from about 5,500 to 50,000 and having grafted thereon at least 1.8 molecules of a carboxylic acid acylating function per molecule or said copolymer and reacting said grafted copolymer with an amino-aromatic polyamine compound from the group consisting of an N-arylphenylenediamine, an aminocarbazole, and an aminoperimidine to form said graft and amine-derivatized copolymer, and a lubricating oil composition containing same are provided.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,234,435, 4,320,019, 4,340,689, 4,357,250, 4,382,007, 4,713,489, 4,863,623 and 5,075,383 are incorporated herein by reference.

An object of this invention is to provide a novel derivatized graft copolymer composition.

Another object of the invention is to provide a bi-functional lubricant additive effective for imparting dispersancy properties to a single grade lubricating oil composition.

A further object is to provide a novel lubricating oil composition containing the graft copolymer additive of the invention as well as to provide concentrates of the novel additive of invention.

SUMMARY OF THE INVENTION

The present invention provides an additive composition prepared by the steps comprising:

(A) reacting a polymer prepared from ethylene and at least one ($C_3$–$C_{10}$) alpha-monoolefin and, optionally, a polyene selected from non-conjugated dienes and trienes comprising from about 15 to 80 mole percent of ethylene from about 20 to 85 mole percent of said ($C_3$–$C_{10}$) alpha-monoolefin and from about 0 to 15 mole percent of said polyene, said polymer having a number average molecular weight ranging from about 1000 to about 40,000, with an excess in equivalence of an olefinic carboxylic acid acylating agent per equivalent weight of said polymer, said process comprising heating said polymer to a molten condition at a temperature in the range of about 250° C. to about 450° C. and, simultaneously, or sequentially in any order, reducing the molecular weight of said polymer with mechanical shearing means and grafting said olefinic carboxylic acylating agent onto said polymer, thereby producing a grafted, mechanical shearing means and grafting said olefinic carboxylic acylating agent onto said polymer, thereby producing a grafted, reduced molecular weight polymer having a number average molecular weight ranging from 5,500 to 50,000 and having at least 1.8 molecules of said carboxylic acid acylating function grafted onto each copolymer molecule of said reduced polymer; and (B) reacting said grafted reduced polymer in (A) with an amino-alcohol compound selected from the group consisting of:

(a) a 2-Anilinoalcohol represented by the formula

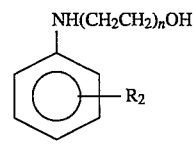

in which n=1–10 and $R^2$ is hydrogen or a ($C_4$–$C_{24}$) alkyl, alkenyl, alkoxyl, alkylaryl or arylalkyl group;

(b) a (2-Hydroxyalkyl)pyridine represented by the formula

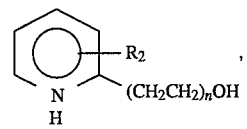

in which n=1–10 and $R^2$ is hydrogen or a ($C_4$–$C_{24}$) alkyl, alkenyl, alkoxyl, alkylaryl or arylalkyl group;

(c) a 4-(2-Hydroxyalkyl)morpholine represented by the formula

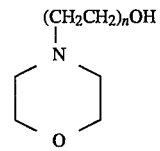

in which n=1–10;

(d) a 1-(2-Hydroxyalkyl)piperazine represented by the formula

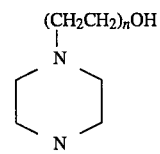

in which n=1–10;

(e) a 1-(2-Hydroxyalkyl)2-pyrrolidinone represented by the formula

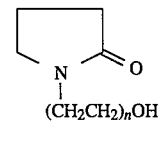

in which n=1–10; and (f) a 1-(2-Hydroxyalkyl)2-pyrrolidine represented by the formula

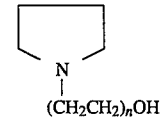

in which n=1–10;
to produce an ester represented by the formula

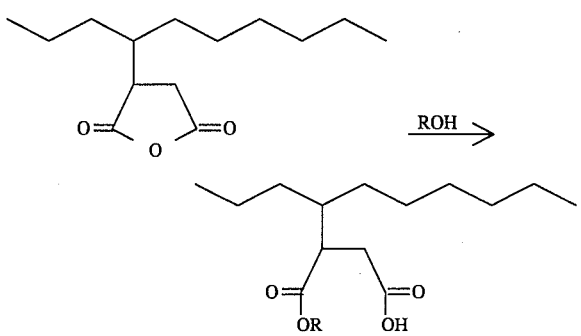

where R is one of the above amine alcohol compounds.

The novel lubricant of the invention comprises an oil of lubricating viscosity and an effective dispersant amount of the novel reaction product. This unique product is specifically useful for a single grade lubricating oil composition.

Concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins.

Conventional sludge dispersants for lubricating oils have been of the alkenyl succinimide type of over 20 years. Recent changes in test procedures have made it more difficult to qualify these types of dispersants for use in single grade lubricating oils without substantially increasing their treating dosage. The product whose processes of manufacture are described above is differentiated from the prior art described above in that, it can be incorporated into a single grade oil formulation. Most unexpectedly, it exhibits satisfactory Sequence VE engine test performance without the necessity of additional conventional alkenyl succinimide dispersant. Of course, it may be used in the conjunction with a conventional alkenyl succinimide dispersant.

The novel lubricant of the present invention comprises an oil of lubricating viscosity and an effective novel additive. The novel reaction product will add dispersancy properties to the lubricating oil. The invention specifically relates to graft copolymers as dispersant additives for lubricating oils. This application relates to graft copolymers, wherein the grafted monomer units are primarily polar oxygen containing monomers followed by esterification reaction with aminoalcohols.

The novel reaction products of the present invention are unique because they exhibit dispersancy along with varnish inhibition while inhibiting cross-linking with resulting viscosity increase, haze or gelling. The excellent dispersant characteristics are surprising in light of the low graft level of amine substituted alcohol.

The lubricating oil additive of the present invention may be replaced by means of a solution polymerization process or via mechanical/thermal shearing techniques. The mechanical/thermal shearing can be done in either an extruder or a batch intensive mixer (Haake or Brabender) or a simple reaction vessel. The mechanical/thermal shearing brings about degradation of the high molecular weight polymer (i.e. 100,000 MW) to a low molecular weight polymer (i.e. 8,000 number average MW) which has now lost its VI improving properties and becomes a shear stable intermediate from which a dispersant can be manufactured. The shearing may be done to the starting ethylene-propylene copolymer rubber and then grafted with an ethylenically unsaturated carboxylic function (i.e. maleic anhydride) and then further derivatized with an amine substituted alcohol (e.g. 2-Anilinoethanol). Alternatively, shearing may be done to the pre-derivatized rubber followed by treatment with an amine substituted alcohol. In the case, where an extruder is used the ethylene-propylene copolymer rubber may be grafted with an ethylenically unsaturated carboxylic function while simultaneously being sheared.

The present invention comprises an ethylene copolymer or terpolymer of a ($C_3$–$C_{10}$) alpha-mono olefin and optionally a non-conjugated diene or triene having an average molecular weight ranging from about 1000 to 40,000 (6,000 to 10,000 preferred) on which, at some stage of one of the processes, has been grafted 0.1 to 10% by weight (1.0 to 3.0% preferred) of an ethylenically unsaturated carboxylic function. It is then further derivatized with an amino alcohol such as 2-Anilinoalcohol represented by the formula

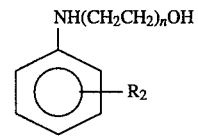

in which n=1–10 and $R^2$ is hydrogen or a ($C_4$–$C_{24}$) alkyl, alkenyl, alkoxyl, alkylaryl or arylalkyl group.

The ethylenically unsaturated carboxylic function is more specifically an alpha- or beta-unsaturated ($C_4$–$C_{10}$) dicarboxylic acid, anhydride or ester thereof, such as fumaric acid, itaconic acid, maleic acid, maleic anhydride, chloromaleic acid, dimethylfumarate, chloromaleic anhydride or monocarboxylic acid such as acrylic acid, methacrylic acid, crotonic acid, cinnamic acid, and mixtures thereof.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer of interpolymer substrate is 1,4-hexadiene.

The triene component will have at least two non-conjugated double bonds, and up to about 30 carbon atoms in the chain. Typical trienes useful in preparing the interpolymer of the present invention are 1-isopropylidene-3a,4,7,7a-tetrahydroindene, 1-isopropylidenedicyclopentadiene, dehydroisodicyclopenta-diene, and 2-(2-methylene-4-methyl-3-pentenyl)[2.2.1]bicyclo-5-heptene.

The polymerization reaction used to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40 to 45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a ($C_3$–$C_{10}$) alpha monoolefin with the most preferred proportions being from 25 to 55 mole percent propylene and 45 to 75 mole percent ethylene.

Terpolymer variations of the foregoing polymers may contain from about 0.1 to 10 mole percent of a non-conjugated diene or triene.

The starting polymer substrate for preparing the additive of the present invention, that is, the ethylene copolymer or terpolymer, is an oil-soluble, substantially linear, rubbery material having a number average molecular weight above about 80,000. Many polymerization processes produce high molecular weight polymers having molecular weights substantially above 80,000 and commonly ranging from 100,000 to 300,000 molecular weight and above. These high molecular weight polymers which provide viscosity index improvement properties when employed in multi-grade lubricating oil compositions must be modified in order to provide a dispersant-antioxidant additive specifically suitable for single grade motor oil compositions. For the purposes of this invention, the high molecular weight polymer substrates must be substantially reduced in molecular weight or substantially degraded to the prescribed molecular weight range in order to be useful for the purposes intended.

High molecular weight polymer substrates or interpolymers are available commercially such as those containing from about 40 to about 60 mole percent ethylene units and about 60 to about 40 mole percent propylene units. Examples are "Ortholeum 2052" and "PL-1256" available from E. I. dupont deNemours and Company of Wilmington, Del. The former is a terpolymer containing about 48 mole percent ethylene units, 48 mole percent propylene units and 4 mole percent, 1,4-hexadiene units, having an inherent viscosity of 1.35. The latter is a similar polymer with an inherent viscosity of 1.95. The viscosity average molecular weights of these polymers are on the order of 200,000 and 280,000, respectively.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The reduction of the molecular weight of the starting ethylene copolymer having a molecular weight above 80,000 to a molecular weight ranging from 5,500 to 50,000 (this molecular weight range corresponds to about 300–25,000 cSt kinetic viscosity of a 37% concentrate of the finished dispersant) and the grafting of the ethylenically unsaturated carboxylic acid material onto the copolymer may be accomplished simultaneously or it may be accomplished sequentially in any order. If done sequentially, the ethylene copolymer may first be degraded to the prescribed molecular weight and then grafted or, conversely, the grafting may be effected onto the high molecular weight copolymer and the resulting high molecular weight grafted copolymer then reduced in molecular weight. Alternatively, grafting and reduction of the high molecular weight copolymer may be done simultaneously.

Reduction of the molecular weight of the high molecular weight ethylene copolymer to the prescribed molecular weight range, whether grafted, during grafting or prior to grafting, is conducted in the absence of a solvent or in the presence of a base oil, using a mechanical shearing means. Generally, the ethylene copolymer is heated to a molten condition at a temperature in the range of about 250° C. to about 450° C. and it is then subjected to mechanical shearing means until the copolymer is reduced to the prescribed molecular weight range. The shearing may be effected by forcing the molten copolymer through fine orifices under pressure or by other mechanical means.

The grafting of the ethylenically unsaturated carboxylic acid material onto the copolymer either before or after the ethylene copolymer is reduced in molecular weight or during the shearing of the copolymer may be conducted in the presence of a free radical initiator.

The amount of the carboxylic acid material that is grafted onto the prescribed polymer backbone is critical. Thus, at least 1.8 molecules of the carboxylic acid material must be reacted with each molecule of the polymer backbone. It is preferred to react the two or more moles of the carboxylic acid material with each equivalent amount of the polymer. Broadly, the carboxylic acid material should be employed in the ratio from 1.8 to 5 molecules per molecule of the polymer backbone with a preferred ratio being from 2 to 5 molecules and a still more preferred ratio being from 2.25 to 4 molecules. Highly effective additive materials have from 2.5 molecules to 3.5 molecules of the carboxylic acid material or maleic anhydride grafted onto each polymer molecule.

The free-radical initiators which may be used are peroxides, hydroperoxides, and azo compounds and preferably those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

The grafted reduced polymer possessing carboxylic acid acylating functions is reacted with an amino alcohol compound selected from the group consisting of:

(B) reacting said grafted reduced polymer in (A) with an amino-alcohol compound selected from the group consisting of:

(a) a 2-Anilinoalcohol represented by the formula

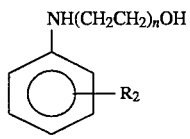

in which n=1–10 and $R^2$ is hydrogen or a $(C_4-C_{24})$ alkyl, alkenyl, alkoxyl, alkylaryl or arylalkyl group;

(b) a (2-Hydroxyalkyl)pyridine represented by the formula

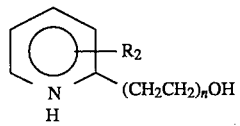

in which n=1–10 and $R^2$ is hydrogen or a $(C_4-C_{24})$ alkyl, alkenyl, alkoxyl, alkylaryl or arylalkyl group;

(c) a 4-(2-Hydroxyalkyl)morpholine represented by the formula

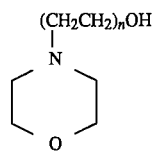

in which n=1–10;

(d) a 1-(2-Hydroxyalkyl)piperazine represented by the formula

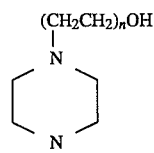

(e) a 1-(2-Hydroxyalkyl)2-pyrrolidinone represented by the formula

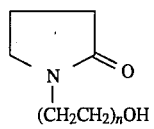

in which n=1–10; and (f) a 1-(2-Hydroxyalkyl)2-pyrrolidine represented by the formula

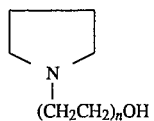

in which n=1–10.

Particularly preferred amino-alcohols are 2-anilinoethanol, 1-(2-Hydroxyethyl)2-pyrrolidinone and 2-(2-hydroxyethyl)pyridine.

The reaction between the polymer substrate intermediate having grafted thereon carboxylic acid acylating function and the prescribed amino-alcohol compound is conducted by heating a solution of the polymer substrate under inert conditions and then adding the amino-alcohol polyamine compound to the heated solution generally with mixing to effect the reaction. It is convenient to employ an oil solution of the polymer substrate heated to 140° C. to 175° C. while maintaining the solution under a nitrogen blanket. The amino-alcohol compound is added to this solution and the reaction is effected under the noted conditions.

The following examples illustrate the preparation of the novel reaction product additive of the invention and include comparison examples.

EXAMPLE I

The mechanical/thermal shearing preparation of low molecular ethylene-propylene copolymer utilizing an extruder.

The ethylene-propylene copolymer (100,000 Number Avg. MW) was chopped and processed through an extruder in a molten state at a temperature near 400° C., just prior to entering the extruder screw maleic anhydride and dicumylperoxide was mixed with the molten polymer and the polymer exiting from the die face of the extruder was grafted with 2.3% maleic anhydride. The ethylene-propylene copolymer grafted with 2.3 weight percent maleic anhydride (1000 g) was dissolved in SNO 100 upon exit from the extruder resulting in an approximate 50% concentrate in oil.

EXAMPLE II

Preparation of dispersant from ethylene-propylene copolymer (8,000 number average MW) grafted with 2.3% maleic anhydride and 2-anilinoethanol A 48.4 weight percent mixture of ethylene-propylene copolymer grafted with 2.3 weight percent maleic anhydride in oil (900 g) was charged into a 3000 mL 4-neck kettle along with SNO 100 oil (280 g). The kettle was equipped with a mechanical stirrer, thermometer, thermocouple, and nitrogen inlet and heated to 160° C. Next, 2-anilinoethanol (20.8 g, 0.15 moles) was added along with Surfonic L-46-7 (34.8 g). The reaction temperature was maintained at 160° C. for 6 hours. The product (an approximately 33% concentrate) analyzed as follows: % N=0.18 (0.17 calc.), and Kinetic Viscosity=1247 cSt @100° C.

EXAMPLE III

Preparation of dispersant from ethylene-propylene copolymer (8,000 number average MW) grafted with 2.3% maleic anhydride and 1-(2-hydroxyethyl)2-pyrrolidinone A 42.8 weight percent mixture of ethylene-propylene copolymer grafted with 2.3 weight percent maleic anhydride in oil (500.0 g) was charged into a 1000 mL 4-neck kettle along with SNO 100 oil (75.0 g). The kettle was equipped with a mechanical stirrer, thermometer, thermocouple, and nitrogen inlet and heated to 160° C. Next, 1-(2-hydroxyethyl)2-pyrrolidinone (9.6 g, 0.075 moles) was added along with Surfonic L-46-7 (17.0 g). The reaction temperature was maintained at 160° C. for 6 hours. The product (an approximately 37% concentrate) analyzed as follows: % N=0.25 (0.18 calc.), and Kinetic Viscosity =1496 cSt @100° C.

EXAMPLE IV

Preparation of dispersant from ethylene-propylene copolymer (8,000 number average MW) grafted with 2.3% maleic anhydride and 2-(2-hydroxyethyl)pyridine A 48.4 weight percent mixture of ethylene-propylene copolymer grafted with 2.3 weight percent maleic anhydride in oil (500.0 g) was charged into a 1000 mL 4-neck kettle along with SNO 100 oil (150 g). The kettle was equipped with a mechanical stirrer, thermometer, thermocouple, and nitrogen inlet and heated to 160° C. Next, 2-(2-hydroxyethyl)pyridine (10.3 g, 0.084 moles) was added along with Surfonic L-46-7 (19.4 g). The reaction temperature was maintained at 160° C. for 6 hours. The product (an approximately 37% concentrate) analyzed as follows: % N=0.19 (0.17 calc.), and Kinetic Viscosity =973 cSt @100° C.

EXAMPLE V

Preparation of dispersant from ethylene-propylene copolymer 8,000 number average (MW) grafted with 2.3% maleic anhydride and 1-(2-hydroxyethyl)-2-pyrrolidine A 48.4 weight percent mixture of ethylene-propylene copolymer grafted with 2.3 weight percent maleic anhydride (Example A) in oil (500 g) was charged into a 1000 mL 4-neck kettle along with SNO 100 oil (149.0 g). The kettle was equipped with a mechanical stirrer, thermometer, thermocouple, and nitrogen inlet and heated to 160° C. Next, 1-(2-hydroxyethyl)-2-pyrrolidine (9.7 g, 0,084 moles) was added along with Surfonic L-46-7 (19.4 g). The reaction temperature was maintained at 160° C. for 6 hours. The product (an approximately 33% concentrate) analyzed as follows: % N=0.18 (0.17 calc.), and Kinetic Viscosity=1112 cSt @100° C.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A concentration range for the additive ranging from about 0.5 to weight percent based on the total weight of the oil composition is preferred with a still more preferred concentration range being from about 1 to 7.5 weight percent.

Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, anti-wear agents and the like.

The novel additive reaction product of the invention was tested for its effectiveness as a dispersant in a formulated lubricating oil composition. In all of the examples, the polymer substrate was similar comprising about 60 mole percent ethylene and 40 mole percent propylene. The base lubricating oil used in the dispersancy test was a typical formulated lubricating oil as represented by the values set forth below in Table I.

TABLE I

| Component | Parts By Weight |
|---|---|
| Solvent neutral oil A | 75.25 |
| Solvent neutral oil B | 21.64 |
| Zinc Dialkyldithiophosphate | 1.22 |
| 4.4'dinonyldiphenylamine | .39 |
| Overbased magnesium sulfonate | 1.50 |
| Silicone anti-foamant | 150 PPM |
| Product | 4–10 |
| Analyses | |
| Viscosity Kin 40C CS | 30.4 |
| Viscosity Kin 100C CS | 5.33 |
| Pour Point, F. | +10 |
| Ash Sulfated, % D874 | 0.88 |
| Phosphorus, % X-Ray | 0.12 |
| Sulfur, % X-Ray Total | 0.32 |
| Zinc, % X-Ray | 0.13 |

Oil had a sp. gr. 60/60° F. of 0.858–0.868; Vis 100° F. 123–133; Pour Point 0° F. Oil B had a sp. gr. 60/60° F. of 0.871–0.887; Vis. 100° F. 325–350; Pour Point +10° F. Zinc salt is a salt of mixed alcohols-isopropanol and $P_2S_5$ product as described in U.S. Pat. No. 3,292,181. The overbased magnesium sulfonate had a TBN of 395 and is a salt of branched ($C_{20}$–$C_{40}$) monoalkybenzene sulfuric acid (MV 530–540) together with about 10% magnesium carbonate, 14% magnesium hydroxide and 4% magnesium sulfate.

The dispersant properties of the additive-containing oil were determined in the Bench Sludge Dispersancy Test.

BENCH SLUDGE TEST

This test was conducted by heating the test oil mixed with synthetic hydrocarbon blowby and a diluent oil at a fixed temperture for a fixed time period. After heating, the turbidity of the resulting mixture was measured. A low percentage turbidity (0 to 20) was indicative of good dispersancy while a high value (20 to 100) is indicative of an oil's increasingly poor dispersancy. The results obtained with the known and present dispersants are set forth in Table II below, at 4 and 6.5 percent by weight concentration respectively, in a SAE 30 fully formulated motor oil.

TABLE II

| Dispersant Type | Dispersant Conc. | | Rating | | | |
|---|---|---|---|---|---|---|
| | 6.5% | 4.0% | Reference (SG) | Reference (good) | Reference (fair) | Reference (poor) |
| II | 32 | 45 | 25 | 37 | 44 | 87 |
| III | 49 | 41 | 39 | 36 | 36 | 99 |
| IV | 51 | 80 | 40 | 41 | 49 | 108 |
| V | — | 64 | 41 | 40 | 35 | 100 |

ENGINE TEST RESULTS

The ASTM Sequence VE gasoline engine test was used to evaluate the performance of gasoline engine oils in protecting engine parts from sludge and varnish deposits and valve train wear due to low temperature "stop and go" operation. The test used a Ford 2.3 L four-cylinder Range truck engine. The engine was cycled through three test stages, requiring four hours to complete. The time period for the test was 288 hours or 72 cycles. The Sequence VE gasoline engine test results shown in Table III were run in a single grade fully formulated motor oil.

TABLE III

Sequence VE Gasoline Engine Test Results

| 5.5% dispersion in Standard evaluation base oil[1] | LEPSA[2] w/ 2-Anilinoethanol |
|---|---|
| Average sludge (9.0 min) | 9.4 |
| Average varnish (5.0 min) | 5.8 |
| Piston skirt varnish (6.5 min) | 7.2 |
| Oil ring clogging (15 max) | 13.8 |
| Oil screen clogging (20 max) | 0.0 |
| Rocker arm cover Sludge 7.0 min | 8.3 |
| Cam lobe wear, max 15 max | 1.1 |
| Cam lobe wear, avg. 5.0 max | 0.4 |

[1] SAE 30, PC-628 formulated motor oil with 5.5 wt % dispersant
[2] LEPSA: Low ethylene propylene succinic anhydride The results in Table III indicate that dispersant 1 is superior to dispersant 2 in Average sludge based on the severity bias adjustment.

What is claimed is:

1. A dispersant additive composition prepared by the steps comprising:

(A) reacting a polymer prepared from ethylene and at least one ($C_3$–$C_{10}$) alpha-monoolefin and, optionally, a polyene selected from non-conjugated dienes and trienes comprising from about 15 to 80 mole percent of ethylene from about 20 to 85 mole percent of said ($C_3$–$C_{10}$) alpha-monoolefin and from about 0 to 15 mole percent of said polyene, with an excess in equivalence of an olefinic carboxylic acid acylating agent per equivalent weight of said polymer, said polymer being obtained by heating a polymer having a number average molecular weight above about 80,000 to a molten condition at a temperature in the range of about 250° C. to about 450° C. and, simultaneously, or sequentially in any order, reducing the molecular weight of said polymer with mechanical shearing means and grafting said olefinic carboxylic acylating agent onto said polymer, thereby producing a grafted, reduced molecular weight polymer having a number average molecular weight ranging from 1000 to 50,000 and having at least 1.8 molecules of said carboxylic acid acylating function grafted onto each copolymer molecule of said reduced polymer; and (B) reacting said grafted reduced polymer in (A) with an amino-alcohol compound selected from the group consisting of:

(a) a 2-Anilinoalcohol represented by the formula

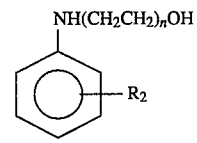

in which n=1–10 and $R^2$ is hydrogen or a ($C_4$–$C_{24}$) alkyl, alkenyl, alkoxyl, alkylaryl or arylalkyl group;

(b) a (2-Hydroxyalkyl)pyridine represented by the formula

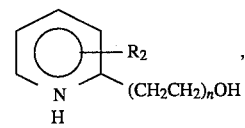

in which n=1–10 and $R^2$ is hydrogen or a ($C_4$–$C_{24}$) alkyl, alkenyl, alkoxyl, alkylaryl or arylalkyl group;

(c) a 4-(2-Hydroxyalkyl)morpholine represented by the formula

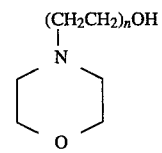

in which n=1–10;

(d) a 1-(2-Hydroxyalkyl)piperazine represented by the formula

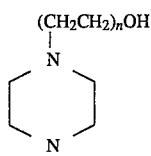

in which n=1–10;
(e) a 1-(2-Hydroxyalkyl)2-pyrrolidinone represented by the formula

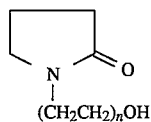

in which n=1–10; and
(f) a 1-(2-Hydroxyalkyl)2-pyrrolidine represented by the formula

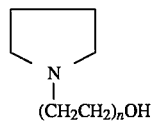

in which n=1–10;
to produce an ester represented by the formula

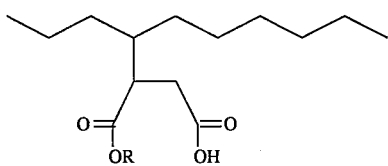

where R is derived from one of the above amine alcohol compounds.

2. A composition according to claim 1, in which said reaction comprises heating said polymer to a molten condition, mixing said olefinic carboxylic acylating agent with said polymer and subjecting said mixture in the absence of a solvent to mechanical shearing means to graft said olefinic carboxylic acylating agent onto said polymer and reduce the molecular weight of said polymer to a range from 5,500 to 50,000.

3. A composition according to claim 1 in which said grafted reduced polymer has a number average molecular weight from about 6,000 to about 10,000.

4. A composition according to claim 1 in which said grafted reduced polymer comprises from about 25 to 75 mole percent ethylene and from about 25 to 75 mole percent of a $C_3$ to $C_{10}$ alpha-mono-olefin.

5. A composition according to claim 1 in which said polymer comprises from about 40 to 65 mole percent ethylene and from about 35 to 60 mole percent of propylene.

6. A composition according to claim 4 which contains from about 0.1 to 10 mole percent of a polyene.

7. A composition according to claim 1 in which said olefinic carboxylic acid acylating agent is maleic anhydride.

8. A composition according to claim 1 in which said amino-alcohol compound is 2-Anilinoalcohol.

9. A composition according to claim 8 in which said amino-alcohol compound is 2-Anilinoethanol.

10. A composition according to claim 1 in which said grafted reduced polymer has from about 2 to 5 molecules of said carboxylic acid acylating function per molecule of said polymer.

11. A composition according to claim 1 in which grafted reduced polymer has from about 2.25 to 4 molecules of said carboxylic acid acylating function per molecule of said polymer.

12. A composition according to claim 1 in which said grafted reduced polymer has from about 2.5 to 3.75 molecules of said carboxylic acid acylating function per molecule of said reduced polymer.

13. A composition according to claim 1 in which the mechanical shearing means for the reaction between said polymer and said carboxylic acid acylating agent is an extruder.

14. A composition comprising a mixture of the reaction product of claim 1 and the reaction product of a grafted polymer and an amine having in its structure one primary amine group and either a tertiary or a highly hindered secondary amine group.

15. A composition comprising a mixture of the reaction product of claim 1 and the reaction product of a grafted polymer and an amine selected from the group consisting of aminopropylmorpholine, aminoethylmorpholine, and N-methyl-aminopropylpiperazine.

16. A lubricating oil composition comprising a major amount of an oil of lubricating viscosity and a minor amount effective to impart dispersancy properties to said oil of the additive composition of claim 1.

17. A lubricating oil composition comprising a major amount of an oil of lubricating viscosity containing from about 0.1 to 30 weight percent of the additive of claim 1.

18. A lubricating oil composition comprising a major amount of an oil of lubricating viscosity containing from about 0.5 to 15 weight percent of the additive of claim 1.

19. A lubricating oil composition comprising a major amount of an oil of lubricating viscosity and from about 1 to 7.5 weight percent of the additive of claim 1.

20. A single grade lubricating oil composition comprising an oil of lubricating viscosity and from about 0.5 to 15 weight percent of the additive of claim 1.

21. A composition according to claim 1, wherein the grafted reduced copolymer has a number average molecular weight of ranging from about 1000 to about 40,000.

\* \* \* \* \*